June 5, 1962
J. F. HINRICHS
3,038,059
WELDING NOZZLE
Filed March 17, 1960
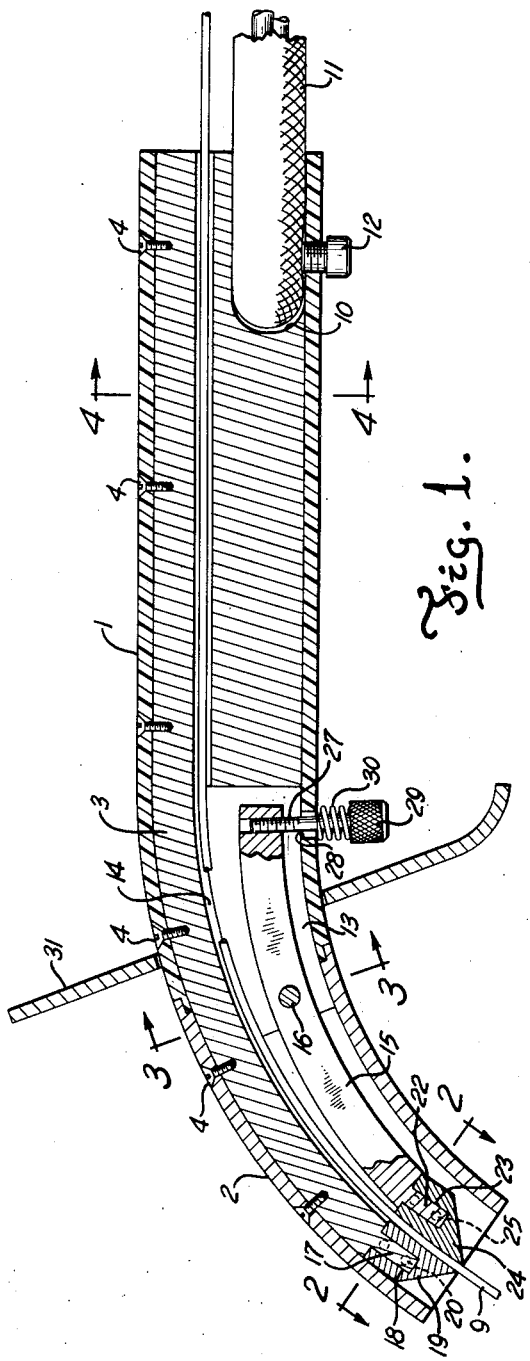
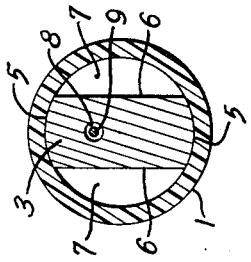
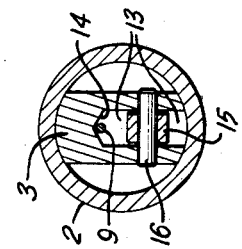
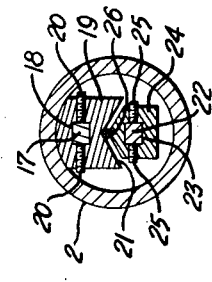
INVENTOR.
JOHN F. HINRICHS
BY
*Andrus & Starke*
Attorneys

United States Patent Office 3,038,059
Patented June 5, 1962

3,038,059
WELDING NOZZLE
John F. Hinrichs, Milwaukee, Wis., assignor to A. O. Smith Corporation, Milwaukee, Wis., a corporation of New York
Filed Mar. 17, 1960, Ser. No. 15,686
4 Claims. (Cl. 219—130)

This invention relates to an improved welding nozzle for a consumable electrode welding process, and more particularly to a welding nozzle which utilizes a lever action principle to provide a positive electrical contact with the wire electrode.

In a consumable electrode welding process, an arc is established between the workpiece and the wire electrode, which is contained on a reel or spool, is fed toward the arc at a rate proportional to the rate at which it is consumed by the welding art. In a process of this type, a nozzle is employed to guide the wire to the arc and to provide an electrical contact with the wire.

The present invention is directed to a welding nozzle having a pair of contact jaws disposed within an insulated housing. One of the jaws is fixed with respect to the housing and the other jaw is pivotally mounted to the housing. The electrode wire passes between the jaws and a spring acts to draw the innermost end of the pivotally mounted jaw radially outward and forces the outermost end of the jaw toward the fixed jaw to thereby provide a positive electrical contact with the electrode wire.

A passage is provided within the nozzle through which a suitable shielding medium may pass and be ejected toward the arc, providing a shield of the welding zone.

The employment of a spring tension lever permits the use of varying diameters of wire without necessitating a change of contact jaws or causing a loss of positive contact with the electrode, as well as facilitating the cleaning of the jaws.

The invention also employs replaceable contact jaw tips. Such an arrangement has a dual advantage in permitting replacement of the contact jaw tips to accommodate varying electrode diameters and permitting the replacement of worn out jaw tips.

Various objects and advantages of the invention will hereinafter become more fully apparent from the following description of the drawings illustrating presently preferred embodiments thereof, and wherein:

FIGURE 1 is a longitudinal section illustrating the welding nozzle of the invention;

FIG. 2 is a transverse section taken on line 2—2 of FIGURE 1;

FIG. 3 is a transverse section taken on line 3—3 of FIGURE 1; and

FIG. 4 is a transverse section taken on line 4—4 of FIGURE 1.

Referring more specifically to the drawings and with reference to FIGURE 1, the welding nozzle includes an insulated elongated tubular sheath 1 and a metallic, generally curved shield 2 which is secured to the end of the sheath. A conductor 3 is disposed longitudinally within the sheath and shielded and is attached thereto by a plurality of screws 4.

The conductor has opposed curved surfaces 5 conforming substantially to the contour of the sheath 1 and flat sides 6 radially removed from the walls of the sheath and defining longitudinal passages 7. These passages, best seen in FIGS. 2, 3 and 4, are connected to a source of supply of a suitable shielding medium and serve to conduct the medium to the welding zone. The shielding medium acts to purge the wire electrode and to flood the welding zone thereby protecting the weld from the atmosphere. This has the effect of insuring a weld of uniform composition and strength, free from impurity.

Conductor 3 is provided with a central longitudinally extending aperture 8 which acts as a conduit for the wire 9.

The use of a curved nozzle will cause the continuous wire electrode to emerge from the nozzle in a substantially straight condition thereby removing the cast imparted in the wire by coiling.

Disposed within the inner end of the conductor is a recess 10 which receives a power cable 11 connected to a source of power. A set screw 12 acts to retain cable 11 in recess 10.

The outer end of conductor 3 is provided with an elongated recess 13 and the wall of the conductor bordering the recess is formed with a longitudinally extending groove 14 disposed in alignment with aperture 8 and acts to maintain the alignment of wire 9 being fed through the aperture 8.

As is best viewed in FIG. 3, a contact lever 15 is disposed within recess 13 and is pivotally connected therein to the walls of the conductor 3 by bordering the recess with a pin 16.

The outer end of conductor 3 is provided with a tongue 17 which is engaged within a complementing recess 18 formed in a contact jaw 19. Screws 20 act to join jaw 19 to conductor 3. The upper surface of jaw 19 conforms to the curvature of shield 2 while the outermost surface of jaw 19 forms an acute angle with the inner surface of the shield. As is best illustrated by FIG. 2, a groove 21 is formed in the lower surface of jaw 19 and the vertex of the groove 21 acts to receive the wire 9 being fed from the groove 14 in recess 13. The degree of angle employed in defining groove 21 is determined by the diameter of the wire electrode to be used. An increase in such a diameter will necessitate a groove of correspondingly greater angle.

The outermost end of contact lever 15 is provided with a tongue 22 which is engaged within a complementary recess 23 of a replaceable contact jaw 24. Screws 25 act to join jaw 24 to contact lever 15. The upper surface of contact jaw 24 is formed with a ridge to complement groove 21 of contact jaw 19. Disposed in the ridge or apex of the upper surface of jaw 24 is a groove 26, the size of which, as in the case of groove 21, is determined by the diameter of the electrode to be employed.

The innermost end of contact lever 15 is provided with a threaded opening to receive an adjustment pin 27 which extends through an opening 28 in sheath 1 and is formed with an enlarged head 29 located externally of the sheath 1. A tension spring 30 externally mounted on sheath 1 bears against head 29 and biases the inner end of lever radially outwardly.

When adjustment pin 27 has been threaded into contact lever 15, tension spring 30 exerts pressure against the enlarged head 29 of pin 27 which in turn draws the innermost end of the pivotally mounted contact lever 15 radially outward thereby forcing contact jaw 24, carried by the outer end of the contact lever 15, into positive engagement with contact jaw 19 and electrode 9. Tension spring 29 will maintain a continuous positive engagement of the contact jaws with the electrode throughout the welding operation. The tension spring acts to automatically and independently adjust the contact jaws to compensate for any changes at the point of contact of the jaws and electrode due to expansion or contraction of the jaws or small variations in the size of the electrode wire.

The tension in spring 30 may be increased by threading down pin 27 in contact lever 15 thereby proportionally increasing the pressure exerted against the head 29 of adjustment pin 27. Several electrode diameters varying slightly in size may be employed without necessitating contact jaw replacement due to the action of tension spring 30.

A suitable insulating shield 31 is mounted upon insulated sheath 1 to protect the welder's hand from the heat and radiation generated from the arc. Insulating shield 31 will also act to shield pin 27 and spring from the effects of arc heat and welding spatter.

Since both jaws 19 and 24 are readily replaceable, a welder may greatly increase and decrease the diameter of the electrode he is using by merely replacing the contact jaws with jaws having correspondingly larger or smaller grooves located therein thereby insuring positive gripping of the electrode by the contact jaws.

The present invention can be employed in both manual and automatic welding operations and provides a structure whereby a positive contact can be had with the welding wire at all times. This acts to enhance the efficiency of the welding instrument and insure uniformity in the weld deposit. In equipping the welding device with passages for the expulsion of a suitable shielding medium, the above effects are further promoted.

Various modes of carrying out the invention are contemplated as being within the scope of the following claims particularly pointing out and distinctly claiming the subject matter which is regarded as the invention.

I claim:

1. A welding nozzle, comprising a tube having a curved portion at one end, an elongated conductor disposed centrally within the tube and conforming substantially to the curvature of the tube, a portion of the periphery of said conductor being spaced from the wall of the tube to provide a longitudinal passage extending the length of the tube and adapted to conduct a shielding gas to the welding arc, said conductor having a longitudinal aperture acting as a conduit for a wire electrode being fed from a source of supply to the arc, means to connect said conductor to a power source, a first contact jaw connected to the curved end of said conductor and acting to receive and guide the electrode being fed from the aperture in said conductor, a contact member pivotally mounted in said tube and having a second contact jaw complementing the first contact jaw, a pin adjustably connected to the inner end portion of the contact member and extending externally of said tube through an opening therein, said pin having an enlarged head disposed externally of the tube, resilient tensioning means disposed between the enlarged head of said pin and the outer surface of the tube whereby said tensioning means acts against the enlarged head of the pin to urge the inner end of the second jaw laterally outward and thereby urge the outer end of the second jaw toward the first jaw to resiliently grip the electrode wire.

2. A welding nozzle, comprising a tube, an elongated conductor disposed within said tube, means connecting said conductor to a power source, a contact jaw at the outermost end of said conductor means to guide an electrode through said tube and into contact with said jaw, a contact member disposed within the forward portion of said tube and having a jaw at the outer end thereof complementing said conductor jaw, pivot means disposed between said contact member and said tube to provide for pivoting said contact member thereabout within said tube, a pin adjustably connected to said contact member between an end thereof and said pivot means and extending through said tube, and resilient tensioning means disposed between the tube and an end of said pin whereby manual adjustment of said pin acts to vary the tension of said tensioning means and to force the jaw at the outermost end of said pivoted contact member toward the conductor jaw to thereby produce a continuous positive gripping and contact of said jaws with the electrode being guided into contact with said jaws on a line substantially near the welding end of the nozzle.

3. A welding nozzle comprising a tube, an elongated conductor disposed within the tube, the conductor having a longitudinally extending opening to receive an electrode from a source of supply and having a recess disposed in the outer portion thereof communicating with the longitudinal opening and extending forwardly therefrom to guide the electrode in the tube, means connecting the conductor to a power source, a first contact jaw provided at the outermost end of the conductor, the first contact jaw having walls defining an angular recess disposed in alignment with the recess communicating with the longitudinal opening and adapted to receive and guide an electrode being fed from the longitudinal opening to the recess communicating therewith, a contact member pivotally mounted within the tube and having a second contact jaw at one end thereof, the second contact jaw being provided with an angular projection complementing the angular recess of the first contact jaw and having walls defining a groove in the apex of the angular projection, the walls defining the groove in the apex being operatively associated with the walls defining the angular recess of the first contact jaw to positively grip an electrode fed therebetween, a pin engaging the contact member and extending through the tube, and resilient tensioning means disposed between the tube and an abutment on the pin whereby the tensioning means acts to bias the outermost end of the pivotally mounted contact member bearing the second contact jaw toward the first contact jaw to produce a continuous positive gripping and contact of the walls of the contact jaws defining the contact jaw recesses with the electrode at a line substantially near the welding end of the welding nozzle.

4. The structure of claim 3, and including means for removably connecting the first contact jaw to said conductor and said second contact jaw to the contact member, respectively, to thereby permit the convenient replacement of contact jaws.

References Cited in the file of this patent

UNITED STATES PATENTS

| | | |
|---|---|---|
| 1,959,180 | Stephens | May 15, 1934 |
| 2,179,108 | Westburg | Nov. 7, 1939 |
| 2,289,938 | Smith | July 14, 1942 |
| 2,366,068 | Sohn | Dec. 26, 1944 |
| 2,379,470 | Baird | July 3, 1945 |
| 2,727,970 | Turbett | Dec. 20, 1955 |
| 2,881,305 | Wojciak et al. | Apr. 7, 1959 |
| 2,952,766 | Craig et al. | Sept. 13, 1960 |